United States Patent
Baumgürtel et al.

(10) Patent No.: US 10,399,137 B2
(45) Date of Patent: *Sep. 3, 2019

(54) GALVANIZED METAL OBJECTS AND THEIR MANUFACTURING PROCESS

(71) Applicant: Fontaine Holdings NV, Houthalen (BE)

(72) Inventors: Lars Baumgürtel, Haltern am See (DE); Michael Rahlke, Clapham (GB)

(73) Assignee: FONTAINE HOLDINGS, NV, Houthalen (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,184

(22) Filed: Feb. 27, 2015

(65) Prior Publication Data

US 2015/0251236 A1    Sep. 10, 2015

(30) Foreign Application Priority Data

Mar. 4, 2014   (EP) ..................................... 14157634

(51) Int. Cl.
  *C23C 2/06*   (2006.01)
  *B21D 39/02*  (2006.01)
  (Continued)

(52) U.S. Cl.
  CPC ............. *B21D 39/026* (2013.01); *B21D 5/16* (2013.01); *B32B 15/013* (2013.01); *B65D 1/22* (2013.01);
  (Continued)

(58) Field of Classification Search
  CPC ....................................................... C23C 2/00
  See application file for complete search history.

(56) References Cited

U.S. PATENT DOCUMENTS 3,943,270 A  *  3/1976  Neu .......................... C23C 2/30
                                                    106/1.11
4,610,936 A  *  9/1986  Isobe .................... B32B 15/013
                                                    420/519
(Continued)

FOREIGN PATENT DOCUMENTS

EP           0488423        6/1992
JP        2001049414 A  *   2/2001

OTHER PUBLICATIONS

Machine translation of JP 2001049414A, retrieved 2017.*

*Primary Examiner* — David P Turocy
(74) *Attorney, Agent, or Firm* — Duane Morris LLP; Gregory M. Lefkowitz; Jason M. Nolan (57) ABSTRACT

This invention provides process for manufacturing a galvanized metal three-dimensional object with a shape including multiple edges, said process comprising, in the following order, the steps of:
(A) providing and cutting a metal sheet matrix with a thickness within a range from 0.8 mm to 6 mm, the shape of said metal sheet matrix including multiple free edges,
(B) batch-wise hot dipping said metal sheet matrix into a molten zinc alloy galvanizing bath,
(C) cold-forming the galvanized metal sheet matrix into a desired three-dimensional shape including multiple adjacent metal edges, and
(D) cold-forming a series of joining points for fastening together said multiple adjacent metal edges, to form said galvanized metal three-dimensional object.

9 Claims, 1 Drawing Sheet

(51) Int. Cl.

| | |
|---|---|
| *C23C 2/30* | (2006.01) |
| *B21D 5/16* | (2006.01) |
| *B32B 15/01* | (2006.01) |
| *C23C 2/02* | (2006.01) |
| *C23C 2/26* | (2006.01) |
| *C23C 2/34* | (2006.01) |
| *B65D 1/22* | (2006.01) |
| *C23C 2/40* | (2006.01) |
| *B21D 39/03* | (2006.01) |
| *B21D 51/52* | (2006.01) |
| *C21D 7/02* | (2006.01) |
| *F16B 5/04* | (2006.01) |
| *F16B 5/07* | (2006.01) |

(52) U.S. Cl.
CPC .................. *C23C 2/02* (2013.01); *C23C 2/06* (2013.01); *C23C 2/26* (2013.01); *C23C 2/30* (2013.01); *C23C 2/34* (2013.01); *C23C 2/405* (2013.01); *B21D 39/03* (2013.01); *B21D 51/52* (2013.01); *C21D 7/02* (2013.01); *F16B 5/045* (2013.01); *F16B 5/07* (2013.01); *Y10T 428/12361* (2015.01); *Y10T 428/12799* (2015.01)

(56) References Cited

U.S. PATENT DOCUMENTS

| | | | |
|---|---|---|---|
| 8,555,479 B2 | 10/2013 | Trojer et al. | |
| 2003/0219543 A1* | 11/2003 | Warichet | C23C 2/06 427/433 |
| 2005/0108978 A1* | 5/2005 | Strickland | B21D 47/01 52/633 |
| 2006/0096075 A1 | 5/2006 | Robinson et al. | |
| 2011/0195191 A1* | 8/2011 | Bottanelli | C23C 2/02 427/310 |
| 2014/0120367 A1* | 5/2014 | Warichet | C23C 2/02 428/659 |
| 2014/0120368 A1* | 5/2014 | Warichet | C23C 2/02 428/659 |
| 2014/0120369 A1* | 5/2014 | Warichet | C23G 1/00 428/659 |
| 2014/0120370 A1* | 5/2014 | Warichet | C23G 1/00 428/659 |

* cited by examiner

GALVANIZED METAL OBJECTS AND THEIR MANUFACTURING PROCESS

FIELD OF THE INVENTION

The present invention relates to the manufacture of galvanized metal, especially galvanized steel, objects with a complex shape. In particular the present invention relates to the manufacture of galvanized metal, especially galvanized steel, objects with a shape including multiple edges wherein manufacturing requires forming such objects from a thin metal sheet matrix including multiple free edges and galvanizing said metal sheet matrix. The present invention also relates to such galvanized metal, especially galvanized steel, objects with a complex shape as far as they cannot be produced by means of the currently available manufacturing processes.

BACKGROUND OF THE INVENTION

It is generally known that metal sheets can be assembled by means of welding, riveting, clinching, gluing, crimping, screwing or clip fixing. However in the case of galvanized steel sheets, some of these methods are not applicable in practice or suffer strong constraints that limit their competitiveness or the type of products that can be assembled. For instance, one of the most significant health hazards of the welding process is the generation of fumes and gasses. Since zinc is the coating used for galvanized metals, during welding it produces vaporized droplets (fumes) which, when breathed, may work deeply into the lungs. The typical effect of breathing zinc fumes is metal fume fever. Without proper personal protection, one or two hours after welding one may experience severe symptoms such as thirst, pain in the legs, congestion in the head, throat dryness, and cough. For health reasons, welding of very thick galvanized steel sheets (ISO 1461) is thus not recommendable, or should be avoided as much as possible.

Sheet metal clinching is a cold-forming technique that joints two or more metal pieces without the use of fasteners, bolts, rivets or spot welding. It produces a button-type joint that does not impact the surface finish. It is suitable for high-strength fastening, creates no wasted material and is more affordable than spot welding. This technique is able to achieve clinch point diameters as low as 1.0 mm, and its actual cycle time may be as low as 0.4 second with eccentric presses. For instance, a LED (light-emitting diode) strip made up of galvanized steel 0.6 mm thick and galvanized copper 0.5 mm thick which can be easily joined by means of clinch points with a diameter of 2.0 mm is also known (Tox Pressotechnik GmbH, Weingarten, Germany).

U.S. Pat. No. 8,555,479 discloses producing a load-bearing steel construction connection, wherein a clinch connection connecting a first metal work piece with a second metal work piece is formed by local deformation by means of a die-tool and a counter-tool. Thickness of the metal work pieces is said to be most important or most significant for assessing the clinch connection since the load-bearing capability of the clinch connection is in direct correlation with this variable. The disclosed method is suitable for a steel construction wherein the first work piece thickness is greater than the second work piece thickness and wherein the first work piece thickness is at least 4 mm or the second work piece thickness is at least 3 mm.

U.S. Patent Application Publication No. 2006/096075 discloses a die for use with a punch for mechanically interconnecting, e.g. clinch fastening, a plurality of sheets of a ductile material such as copper, aluminium, steel or iron, wherein the stacked sheets have a combined thickness between 6.3 mm and 25.4 mm.

However the above quoted prior art references do not address the issue of making certain types of galvanized three-dimensional metal objects of complex shape. In particular they do not address the difficulty of dealing with a galvanized metal, especially galvanized steel, cut thin sheet matrix with a shape including multiple free edges. In this circumstance, in addition to the avoidance of cracks in the thin galvanizing coating, the ductility of an aluminium-containing galvanizing coating in combination with the requirement of fastening the multiple free edges represents a challenge to form the final object. This is one problem addressed by the present invention.

At the moment there are very few galvanized steel boxes or containers commercially available and most of them are not objects of complex shape, being made from solid non-holey or fewly holey galvanized steel sheets. This is presumably due to the lack of suitable and non-expensive manufacturing process, as outlined above. As a result of their relatively high production costs such galvanized steel boxes or enclosures have found limited uses in the electrical industry, for instance as junction boxes (for encasing shunts) including galvanized steel solid sheets 1.52 mm thick, with a very small vent area provided on their front door to keep dust-proof and waterproof, and usually also including a galvanized steel continuous hinge and a hasp for padlocking. In this construction of galvanized steel junction boxes, the ratio of the opened surface (ventilation holes) to the total surface is below 0.15. Also for use with electrical conduits are known 4-inch pre-galvanized steel octogonal boxes, 1.5 inch deep with 0.75 inch knockouts, wherein the ratio of the opened surface to the total surface is below 0.10.

The currently available manufacturing processes for producing galvanized steel three-dimensional objects of any complex shape and size suffer from many restrictions and therefore cannot properly fulfill the main market requirements. The use of pre-galvanized metal sheets being hot-dip galvanized through a continuous process would in principle offer the opportunity of forming said metal sheet with subsequent metal cutting and joining and therefore creating objects of complex shape, due to the ductility of some zinc-aluminum alloys. However one first disadvantage of the currently known procedure is that cutting of the metal sheet matrix is carried out after the galvanizing step, and hence the cutting edges are free from the zinc-based galvanizing coating and therefore left without protection against corrosion. This is in most circumstances not acceptable. A post-galvanization cold forming of a metal sheet matrix is usually not satisfactory with a hot dip galvanization method using a standard pure zinc bath since the resulting zinc-iron coating layers are brittle and the metal sheet forming process will inevitably lead to cracks in the protective coating and therefore to a significant reduction of the protection of the three-dimensional object against corrosion, not only instantly but also in the long term. A disadvantage of a currently known procedure wherein galvanization is performed after forming the object is that transporting the three-dimensional object from the forming section of the plant to the galvanizing section involves a lot more space in the production plant than actually necessary, therefore additional costs especially if the object has a substantial volume.

A problem addressed by the present invention is therefore to design a highly effective process for manufacturing galvanized steel three-dimensional objects of any complex shape and size with high product quality due to the fact that the corrosion protection is not locally undermined, e.g. no cracks of the galvanizing layer may occur, and whilst offering the possibility for post-galvanization cold forming a metal sheet matrix without leaving zinc-free cutting edges, and the possibility for afterwards performing a non-thermal joining of metal edges, thus without destroying the zinc coating layer. Another problem addressed by the present invention is to design a non-expensive and flexible manufacturing process for producing galvanized steel three-dimensional objects of any complex shape and size such as, but not limited to, boxes or load-bearing containers suitable for transporting goods. For instance, but this is just an exemplary embodiment, the process should be able to produce galvanized steel three-dimensional objects of various shapes and sizes, optionally with a significant number of openings or holes at a portion of their surface, thus providing light boxes, enclosures or containers with a sufficient mechanical strength, while enjoying all the benefits (in particular corrosion resistance) of a galvanized steel material.

SUMMARY OF THE INVENTION

In its broadest concept, the present invention is based on the unexpected finding that galvanized metal, especially galvanized steel, high quality corrosion-resistant three-dimensional objects of any complex shape and size can be efficiently produced from thin metal sheet matrices, in particular steel sheet matrices, being pre-cut with a shape including multiple free edges without performing metal galvanization subsequent to forming the three-dimensional object and therefore without encountering the various above stated technical and economical disadvantages of the prior art techniques and procedures.

A first advantage of the processing methodology according to the present invention is that it guarantees a full coverage of the metal (e.g. steel) surface, and therefore a full protection of the final three-dimensional object against corrosion, thus participating into the production of high quality long-lasting metal (e.g. steel) products. As another advantage, it is not limited to any type of metal cold forming methodology, and is applicable to all sorts of pre-cut galvanized metal sheet matrices of any complex shape and size, optionally including a holey portion. Therefore the method according to the present invention is particularly useful and flexible for producing a whole range of light weight but mechanically resistant and corrosion-resistant three-dimensional metal objects for a lot of end uses. As yet another advantage it is highly competitive, in terms of manufacturing cost, with the techniques of the prior art. More precisely these goals and advantages are achieved by means of the manufacturing process as defined in claim 1, and the galvanized metal three-dimensional object as defined in claim 11.

DEFINITIONS

The term "hot dip galvanization" as used herein, unless otherwise stated, refers the corrosion treatment of a metal flat product or sheet matrix such as, but not limited to, an iron or steel sheet matrix, by dipping it into a molten bath of pure zinc or a zinc-alloy, in batch operation, for a sufficient period of time to create a protective coating layer at the surface of the flat product or sheet matrix. The term "pure zinc" refers to the zinc galvanizing baths of the prior art that, apart from zinc, may contain trace amounts of some inevitable additives such as for instance antimony, bismuth, nickel or cobalt, but are free from significant amounts of alloying elements. This is in contrast with the term "zinc alloy" that, in addition to zinc, contain significant amounts of one or more other alloying metals such as, but not limited to, aluminium, When applied to steel galvanization, these other alloying metals are also able to participate into the formation of an iron-zinc alloy protective layer.

The expression "formability withstanding a bend test" as used herein, unless otherwise stated, refers to the absence of cracks visible in a galvanizing coating without the use of magnifying aids after forming, folding or bending a galvanized steel sheet under the conditions specified in that bend test.

The term "punching" as used herein, unless otherwise stated, refers to a metal forming process that uses a press to force a punch through a metal sheet to create a hole via shearing, and wherein the punch passes through the sheet into a die. The tool, punch and die, may be made of hardened steel or tungsten carbide. A die is located on the opposite side of the sheet and supports the material around the perimeter of the hole and helps to localize the shearing forces for a cleaner edge. A small clearance is present between punch and die to prevent the punch from sticking in the die and require less force to make the hole. It is able to create multiple shape holes.

In the following description of a galvanizing composition, or a fluxing composition, the different percentages relate to the proportion by weight (wt. %) of each component with respect to the total weight (100%) of the relevant composition. This implies that not all maximum or not all minimum percentages can be present at the same time, in order for their sum to match to 100% by weight.

DETAILED DESCRIPTION OF THE INVENTION

In a first general aspect, the present invention relates to a process for manufacturing a galvanized metal three-dimensional object with a shape including multiple edges, said process comprising, in the following order, the steps of:

(A) providing and cutting a metal sheet matrix with a thickness within a range from 0.8 mm to 6 mm, the shape of said metal sheet matrix including multiple free edges, (B) batch hot dipping said metal sheet matrix into a molten zinc alloy galvanizing bath, (C) cold-forming the galvanized metal sheet matrix into a desired three-dimensional shape including multiple adjacent metal edges, and (D) cold-forming a series of joining points for fastening together said multiple adjacent metal edges, to form said galvanized metal three-dimensional object.

In the process as herein defined, four essential steps are present in a predetermined order. Each step will now be detailed in accordance with a set of preferred embodiments and examples.

With an aim to solve the problems of the prior art technology, the essence of the process of the invention is to first batch hot dip galvanize a pre-cut metal sheet matrix by means of a zinc alloy, and then, post batch hot dip galvanization, clinch a three-dimensional geometric body resulting from cold-forming the pre-cut and galvanized metal (preferably steel) sheet matrix. In accordance with this broad concept, the said geometric body may have a polygonal form, a conic form or any other complex geometric structure stemming from the matrix form. For the easiness of explanations, as well as to provide a useful example of a representative embodiment of the invention, some parts of the following description will focus on a geometric body with a polygonal form, but it should be understood that the invention is in no way restricted to such embodiment. Taking into account the following details for performing this embodiment the skilled person is able, without undue burden and research, to adapt the procedure of the present invention to any other three-dimensional geometric form.

The initial step (A) of the process according to the present invention involves cutting a thin metal sheet matrix into a shape including multiple free edges. In particular embodiments of the invention, the metal sheet matrix thickness may be at least 1.0 mm, or at least 1.2 mm, or at least 1.5 mm. In other particular embodiments of the invention, the metal sheet matrix thickness may be at most 4 mm, or at most 3 mm, or at most 2 mm. Although the thickness of the metal sheet matrix is not a critical parameter of the present invention, it should be suitably adapted to the end use of the three-dimensional metal product to be produced. In particular it should be selected to be the lowest possible value that allows the desirable mechanical strength and durability for the product, for instance the mechanical strength required for a container or box intended for carrying goods. Such selection is within the common knowledge of the skilled person.

The kind of metal sheet matrix, especially the kind of steel sheet matrix, provided in the initial step (A) of the process according to the present invention is not particularly restricted, provided that the metal can be coated with a zinc alloy protective layer in the course of a galvanizing step. The sheet matrix may for instance be made from a large variety of steel grades, in particular sheets made from steel grades having a carbon content up to 0.30 wt. %, a phosphorous content between 0.005 and 0.1 wt. % and a silicon content between 0.0005 and 0.5 wt. %, as well as stainless steel. The classification of steel grades is well known to the skilled person, in particular through the Society of Automotive Engineers (SAE), and may be used for guidance in the performance of the present invention. In one embodiment of the present invention, the metal sheet may be made from a chromium/nickel or chromium/nickel/molybdenum steel susceptible to corrosion. Optionally the steel grade may contain other elements such as sulfur, aluminum, and copper. Suitable examples include, but are not limited to, the steel grades known as AISI 304 (*1.4301), AISI 304L (1.4307, 1.4306), AISI 316 (1.4401), AISI 316L (1.4404, 1.4435). AISI316Ti (1.4571), or AISI 904L (1.4539) [*1.xxxx=according to DIN 10027-2]. In another embodiment of the present invention, the metal may be a steel grade referenced as S235JR (according to EN 10025) or S460MC (according to EN 10149) or 20MnB4 (*1.5525, according to EN 10263). The above examples are given for understanding and illustrative purposes and should in no way be construed as limiting the scope of the present invention, The second step (B) of the process according to the present invention involves batch hot dipping the cut metal sheet matrix from step (A) into a molten zinc alloy galvanizing bath. Although other process parameters for step (B) may be less important, it is critical for the further performance of the manufacturing process as a whole that the zinc alloy bath includes, in addition to zinc, one or more alloying metals in a proportion such that the metal sheet matrix coated with the protective layer resulting from hot dipping has sufficient bendability or foldability to withstand the next process step (C) without incurring cracks in said protective layer. The zinc alloy may be binary (i.e. include one alloying metal, preferably aluminium) or ternary (i.e. include two alloying metals, preferably aluminium and magnesium). A non limiting example of such one or more alloying metals is aluminium, or a mixture of aluminium and magnesium. A suitable proportion of the one or more alloying metals in the zinc alloy is usually at least 2% by weight. Especially suitable is a proportion of aluminium of at least 2% by weight in the zinc alloy. In one embodiment the proportion of aluminium in the zinc alloy may be at least 3% by weight, or at least 4% by weight, or at least 5% by weight. In another embodiment of the Invention the proportion of aluminium in the zinc alloy is suitably at most 25% by weight, or at most 20% by weight, or at most 7 weight % aluminum. A suitable but non restrictive example of such zinc alloys is GALFAN®. When magnesium is present as an alloying metal in the zinc alloy, its content is preferably at least 0.2% by weight, or at least 0.5% by weight, or at least 1% by weight. In one embodiment of the present invention the proportion of magnesium in the zinc alloy is suitably at most 4% by weight, or at most 3% by weight. As is well known in the art, zinc alloys suitable for galvanization may further include trace amounts, e.g. up to 0.1% by weight, of one or more other metals or silicium. Preferably step (8) is performed until the metal sheet matrix is galvanized with a zinc alloy coating having a thickness within a range from about 5 μm to about 20 μm.

Other relevant process parameters for step (B) are the temperature at which the galvanizing bath is maintained, and the dipping time. The temperature is usually maintained within a range from 380° C. to 700° C., preferably from 420° C. to 550° C. The temperature may be kept constant during the overall dipping time, or may be increased or decreased according to a predetermined temperature scheme. The dipping time used in process step (B) usually ranges from 1 to 10 minutes, for instance from 2 to 6 minutes, which mainly depends upon the size and shape of the sheet matrix and upon the desired coating thickness. The thickness of the protective coating layer obtained by carrying out the hot dipping step (B) on the metal sheet matrix, e.g. the steel sheet matrix, can itself be appropriately selected by the skilled person, depending upon a set of parameters including the thickness and/or shape of the metal sheet, the stress and environmental conditions that the metal product is supposed to withstand during its lifetime, the expected durability in time of the protective coating layer formed, etc. For instance a 5-15 μm thick coating layer is usually suitable for a steel sheet being from 0.8 to 1.5 mm thick, and a 15-20 μm thick coating layer is usually suitable for a steel sheet being from 1.5 to 8 mm thick.

During the initial period of step (B), the sheet matrix may optionally be moved in the galvanizing bath in order to assist the re-melting of the metal layer that forms at the sheet matrix surface. In addition, bubbling of an inert gas such as, but not limited to, nitrogen or argon or a mixture thereof may be optionally carried out in the galvanizing bath. This can be achieved for instance by providing a gas diffuser, e.g. made of ceramic or stainless steel, in the galvanizing bath. After the appropriately selected dipping time, the coated sheet matrix is lifted from the bath at an appropriate speed in order to remove the liquid zinc alloy from its surface. The coated sheet matrix may then be cooled in water, e.g. at a temperature of 20° C. to 50° C., or by exposure to a gas flow, e.g. an air flow.

It is usually preferred that between step (A) and step (B) the process according to the present invention involves a further intermediate step, usually denoted as a fluxing step, consisting of batchwise immersing the metal sheet matrix from step (A) into an aqueous fluxing bath based on a flux composition. The kind of flux composition to be used for this intermediate step usually depends upon the kind of galvanizing bath to be used in step (B) but usually comprises zinc chloride, ammonium chloride, alkali or alkaline-earth metal salts, and one or more transition metal chlorides. In one embodiment of the present invention, especially when the zinc alloy of step (B) is a binary aluminium-containing alloy such as GALFAN®, the flux composition used in the intermediate fluxing step may be in accordance with EP1352100, i.e. may preferably comprise (a) from 60 to 80 weight % zinc chloride, (b) from 7 to 30 weight % ammonium chloride, (c) from 2 to 20 weight % of at least one alkali or alkaline-earth metal salt, (d) from 0.1 to 5 weight % of at least one transition metal chloride wherein the transition metal is selected from the group consisting of nickel, cobalt and manganese, and (e) from 0.1 to 1.5 weight % of at least one chloride selected from the group consisting of lead chloride, tin chloride antimony chloride and bismuth chloride. The alkali or alkaline-earth metal salts may be selected for instance from the group consisting of halides, preferably chlorides, of one or more metals such as sodium, potassium, lithium, rubidium, cesium, magnesium, calcium and barium, and more preferably a mixture of sodium chloride and potassium chloride.

Not only with a binary aluminium-containing alloy such as GALFAN®, but also with ternary zinc alloys containing aluminium and magnesium, other flux compositions may provide superior results in the intermediate fluxing step.

In one embodiment of such other flux compositions, the flux may comprise (a) more than 40 and less than 70 wt. % zinc chloride, (b) from 10 to 30 wt. % ammonium chloride, (c) more than 8 and less than 30 wt. % of a set of at least two alkali or alkaline earth metal halides, (d) from 0.1 to 2 wt. % lead chloride, and (e) from 2 to 15 wt. % tin chloride, provided that the combined amounts of lead chloride and tin chloride represent at least 2.5 wt. % of said composition. For instance the set of at least two alkali or alkaline earth metal halides may be a set of at least two alkali metal chlorides and may represent from 10 to 30 wt. %, or from 15 to 25 weight % of the flux composition. For instance said set of at least two alkali metal chlorides may include sodium chloride and potassium chloride in a KC/NaCl weight ratio from 0.2 to 8.0, or from 0.25 to 0.6, or from 1.0 to 2.0, or from 2.0 to 8.0, or from 3.5 to 6.0. In one embodiment, the proportion of lead chloride in the flux composition may be at least 0.4 wt. % or at least 0.7 wt. %. In another embodiment, the proportion of lead chloride in the flux composition may be at most 1.5 wt % or at most 1.2 wt. %. In a specific embodiment, the proportion of lead chloride in the flux composition may be 0.8 to 1.1 wt. %. In one embodiment, the proportion of tin chloride may be at least 2 wt. % or at least 3.5 wt. % or at least 7 wt. %. In another embodiment, the proportion of tin chloride may be at most 14 wt. %. In one embodiment, the combined amounts of lead chloride and tin chloride represent at least 4.5 wt. %, or at most 14 wt. % of the flux composition. In another embodiment, the flux composition may further comprise other salts of lead and/or tin, e.g. the fluoride, or other chemicals that are inevitable impurities present in commercial sources of lead chloride and/or tin chloride.

In another embodiment of such other suitable flux compositions, the flux may comprise (a) more than 40 and less than 70 wt. % zinc chloride, (b) 10 to 30 wt. % ammonium chloride, (c) more than 6 and less than 30 wt. % of a set of at least two alkali metal chlorides including sodium chloride and potassium chloride, (d) from 0 to 2 wt. % lead chloride, and (e) from 0 to 15 wt. % tin chloride, provided that the KCl/NaCl weight ratio of said set of at least two alkali metal chlorides ranges from 2.0 to 8.0. In one embodiment, the KCl/NaCl weight ratio may for instance be from 3.5 to 5.0, or from 3.0 to 6.0.

In both above embodiments of such other suitable flux compositions, the proportion of zinc chloride in the flux composition may be at least 45 wt. % or at least 50 wt. %, or at most 65 wt. % or at most 62 wt. %. Such proportions of $ZnCl_2$ are able, in combination with the respective amounts of lead chloride and tin chloride in the flux composition, to ensure a good coating quality of the metal sheet matrix to be galvanized and to effectively prevent its oxidation during subsequent process steps such as drying, i.e. prior to the hot dip galvanization step (B) itself. In both above embodiments of such other suitable flux compositions, the proportion of $NH_4Cl$ in the flux composition may be at least 13 wt. % or at least 17 wt. %, or at most 26 wt. % or at most 22 wt. %. The optimum proportion of $NH_4Cl$ may be determined by the skilled person, without extensive experimentation and depending upon parameters such as the metal to be galvanized and the weight proportions of the other metal chlorides in the flux composition, to achieve a sufficient etching effect during hot dipping to remove residual rust or poorly pickled spots, while however avoiding the formation of black spots, i.e. uncoated areas of the metal article. In some circumstances it may be useful to substitute a minor part (e.g. less than ⅓ by weight) of $NH_4Cl$ with one or more alkyl quaternary ammonium salt(s) wherein at least one alkyl group has from 8 to 18 carbon atoms such as described in EP 0488.423, for instance an alkyl-trimethylammonium chloride (e.g. trimethyllauryl-ammonium chloride) or a dialkyldimethylammonium chloride.

Whatever the embodiment outlined hereinabove, the flux composition used in the intermediate fluxing step may further comprise suitable amounts of one or more other metal (e.g. transition metal or rare earth metal) chlorides such as nickel chloride, cobalt chloride, manganese chloride, cerium chloride and lanthanum chloride. For instance, the presence of up to 1 wt. % (or up to 1.5 wt. %) nickel chloride is not detrimental to the behavior of the flux composition in terms of quality of the coating obtained after the hot dip galvanization step (B).

Whatever the embodiment outlined hereinabove, the flux composition used in the intermediate fluxing step may further comprise at least one nonionic surfactant or wetting agent which, when combined with the other ingredients, is capable of achieving a predetermined desirable surface tension. Essentially any type of nonionic surfactant, but preferably liquid water-soluble surfactants, can be used. The hydrophilic-lipophilic balance (HLB) of said at least one nonionic surfactant is not a critical parameter and may be selected by the skilled person within a wide range from 3 to 18, for instance from 6 to 16. The flux composition may further comprise at least one corrosion inhibitor, i.e. a compound inhibiting the oxidation of steel particularly in oxidative or acidic conditions. In one embodiment, the corrosion inhibitor includes at least an amino group. Inclusion of such amino derivative corrosion inhibitors in the flux compositions can significantly reduce the rate of iron accumulation in the flux tank. By "amino derivative corrosion inhibitor" is meant herein a compound which inhibits the oxidation of steel and contains an amino group. Aliphatic alkyl amines and quaternary ammonium salts (preferably containing 4 independently selected alkyl groups with 1-12 carbon atoms) are suitable examples of this type of amino compounds. Other suitable examples include hexamethylenediamines. In another embodiment, the corrosion inhibitor includes at least one hydroxyl group, or both a hydroxyl group and an amino group and is well known to those skilled in the art. Suitable amounts of the corrosion inhibitor usually range from 0.02 to 2.0 wt. %. The flux compositions of the invention may comprise both a corrosion inhibitor and a nonionic surfactant or wetting agent. The concentration of the flux composition in the aqueous fluxing bath may range within very wide limits such as 200-750 g/l, preferably 350-750 g/l, most preferably 500-750 g/l or 600-750 g/l.

For use prior to the batch hot dip galvanization step (B), the fluxing bath should advantageously be maintained at a temperature within a range from 50° C. to 90° C., preferably from 60° C. to 80° C. The fluxing step, in discontinuous (batch) operation, is usually performed for a period of time ranging from 0.01 to 30 minutes, or 0.03 to 20 minutes, or 0.5 to 15 minutes, or 1 to 10 minutes depending upon operating parameters such as the composition and/or temperature of the fluxing bath, the composition of the metal (e.g. steel) to be galvanized, and the shape and/or size of the sheet matrix.

It is important for the success of the hot dip galvanizing step (B) that the surface of the sheet matrix be suitably cleaned before performing the fluxing step. Techniques for achieving a desirable degree of surface cleanliness are well known in the art, and may be repeated, such as alkaline cleaning, followed by aqueous rinsing, pickling in acid and finally aqueous rinse. Although all of these procedures are well known, the following description is presented for the purpose of completeness.

Alkaline cleaning can conveniently be carried out with an aqueous alkaline composition also containing phosphates and silicates as builders as well as various surfactants. The free alkalinity of such aqueous cleaners can vary broadly. Thus at an initial process step, the metal article is submitted to cleaning (degreasing) in a degreasing bath such as an ultrasonic, alkali degreasing bath. Then, in a second step, the degreased metal article is rinsed. Next the metal article is submitted to one or more pickling treatment(s) by immersion into an aqueous strongly acidic medium, e.g. hydrochloric acid or sulfuric acid, usually at a temperature from 15° C. to 60° C. and during 1-90 minutes (preferably 3-60 minutes), and optionally in the presence of a ferrous and/or ferric chloride. Acid concentrations of about 5 to 15 wt. %, e.g. 8.12 wt. %, are normally used, although more concentrated acids can be used. In a continuous process the pickling time typically ranges from 5 to 30 seconds, more typically 10 to 15 seconds. In order to prevent over-pickling, one may include in the pickling bath at least one corrosion inhibitor, typically a cationic or amphoteric surface active agent, typically in an amount ranging from 0.02 to 0.2 wt. %, preferably 0.05-0.1 wt. %. Pickling can be accomplished simply by dipping the article in a pickling tank. Additional processing steps can also be used. For example, the article can be agitated either mechanically or ultrasonically, and/or an electric current can be passed through the article for electro-pickling. As is well known these additional processing means usually shorten pickling time significantly. Clearly these pre-treatment steps may be repeated individually or by cycle if needed until the desirable degree of cleanliness is achieved. Then, preferably immediately after the cleaning steps, the metal article is treated (fluxed), e.g. immersed, in a fluxing bath of the invention, preferably under the total salt concentration, temperature and time conditions specified above, in order to form a protective film on its surface.

The fluxed metal (e.g. steel) sheet matrix. i.e. after immersion in the fluxing bath during the appropriate period of time and at the suitable temperature, is preferably subsequently dried. Drying may be effected by transferring the fluxed metal sheet through a furnace having an air atmosphere, for instance a forced air stream, where it is heated at a temperature from 220° C. to 250° C. until its surface exhibits a temperature between 170° C. and 200° C., e.g. for a period of 5 to 10 minutes.

The following step (C) of the process according to the present invention involves cold-forming the galvanized metal sheet matrix resulting from the hot dip galvanization step (B) into a desired three-dimensional shape including multiple adjacent metal edges. This step (C) may be performed by any metal cold-forming technique known to the skilled person. For instance, a representative embodiment of step (C) includes bending or folding the galvanized metal sheet matrix or parts thereof by means of bending or folding tools and procedures known in the art. Surprisingly it has been found that step (C) does not induce any cracks or other kind of weakness in the galvanized metal sheet matrix since the latter exhibits a suitable foldability. For instance, but this is only one representative embodiment, not a restriction, of the present invention, the galvanized metal sheet matrix exhibits a foldability withstanding a bend test selected from the group consisting of ISO 7438, ASTM E290, JIS Z2248 and IS 1599.

The final step (D) of the process according to the present invention involves cold-forming a series of joining points for fastening together the multiple adjacent metal edges of the cold-formed galvanized metal sheet matrix from step (C), in order to form the desired galvanized metal three-dimensional object. Any technique known in the art for cold-forming a series of joining points may be used for the purpose of the present invention. Although this is not a limiting feature of the invention, a useful embodiment involves cold-forming a series of clinching points for fastening together the multiple adjacent metal edges of the cold-formed galvanized metal sheet matrix from step (C), to form the desired galvanized metal three-dimensional object. Any type of clinching system or tool known in the art may be used, either single stroke clinching or multi stroke clinching, with or without cutting, and the clinching point being round, rectangular, multi-sectional, double or flat, or any other geometry known in the art.

A significant advantage of the process according to the present invention is that it is widely applicable to any type of metal steel matrix, including the circumstance where a portion of the metal sheet matrix provided in step (A) is optionally punched with a series of holes, as may be desirable to gain weight for certain types of three-dimensional objects. The density of such holes, i.e. the ratio of the opened surface to the total surface of said portion including a series of holes, is not restricted and may be for instance from 0.2 to 0.7, or from 0.25 to 0.6, or from 0.3 to 0.5, depending upon the mechanical strength to be achieved.

In a second general aspect, the present invention relates to galvanized metal three-dimensional object with a shape including multiple edges, being formed from a metal sheet matrix with a thickness within a range from 0.8 mm to 6 mm, said object having a galvanizing coating with a thickness within a range from 5 to 20 μm and a composition comprising (a) from 2 to 25 weight % aluminum, (b) from 0 to 4% magnesium, (c) up to 0.1 weight % of one or more other metals or silicium, and (d) the rest being zinc, wherein said multiple edges are fastened together by means of a series of clinching points. As described hereinabove, the metal of said three-dimensional object is preferably steel, and portions of said object may optionally include a series of holes, each time where such a holey portion is not detrimental to the intended final use of the object, especially when it may contribute to a weight reduction without being detrimental to the mechanical strength. All such objects are obtainable, under economically advantageous conditions, by the manufacturing process described herein-above as a first broad aspect of the invention, or any one of its illustrative embodiments.

For instance the galvanized metal three-dimensional object of this invention may be a load-bearing polygonal container suitable for transporting goods. Although this is only a particular embodiment of the invention, it will now be described in some details. The galvanized metal container of the invention comprises a galvanized metal flat polygonal bottom and at least three galvanized metal walls inclined with respect to (e.g. substantially perpendicular to) said galvanized metal flat polygonal bottom, and a series of clinching points for fastening said galvanized metal walls together at their adjacent edges, the thickness of each of said galvanized metal polygonal bottom and walls being within a range from 0.8 mm to 6 mm. If suitable for the end-use of the container, at least one of said galvanized metal polygonal bottom and said walls may be punched with a series of holes. The number of holes is not particularly restricted, and the ratio of the opened surface to the total surface of a punched polygonal bottom or wall may be from 0.2 to 0.7. The number of walls is equal to the number of sides of the polygonal bottom and may be for instance 3 (triangle bottom), 4 (e.g. square or rectangular bottom), 5 (pentagonal bottom), 6 (hexagonal bottom), 8 (octagonal bottom), 10, etc. By varying the number and dimensions of sides, and the degree of slope of the walls with respect to the flat bottom, an unlimited number of polygonal shapes may be obtained. The dimensions (other than the thickness) of each galvanized metal polygonal bottom or wall are not particularly limited, except by the limits of the batch hot dip galvanizing bath. Each of said dimensions may for instance independently be within a range from 10 cm to 200 cm, e.g. from 20 cm to 150 cm, or from 25 cm to 100 cm. In a preferred embodiment of the invention, each one of the polygonal bottom and walls of the galvanized metal container is coated with a zinc-based galvanizing coating having a thickness within a range from 5 to 20 μm.

By performing the manufacturing process described hereinabove, virtually any type of corrosion resistant metal three-dimensional object may be produced at will under highly effective economic conditions.

The following example is merely illustrative of the possibilities offered by the process of the present invention, and should not be construed as limiting its scope in any way.

EXAMPLE

Figure 1:
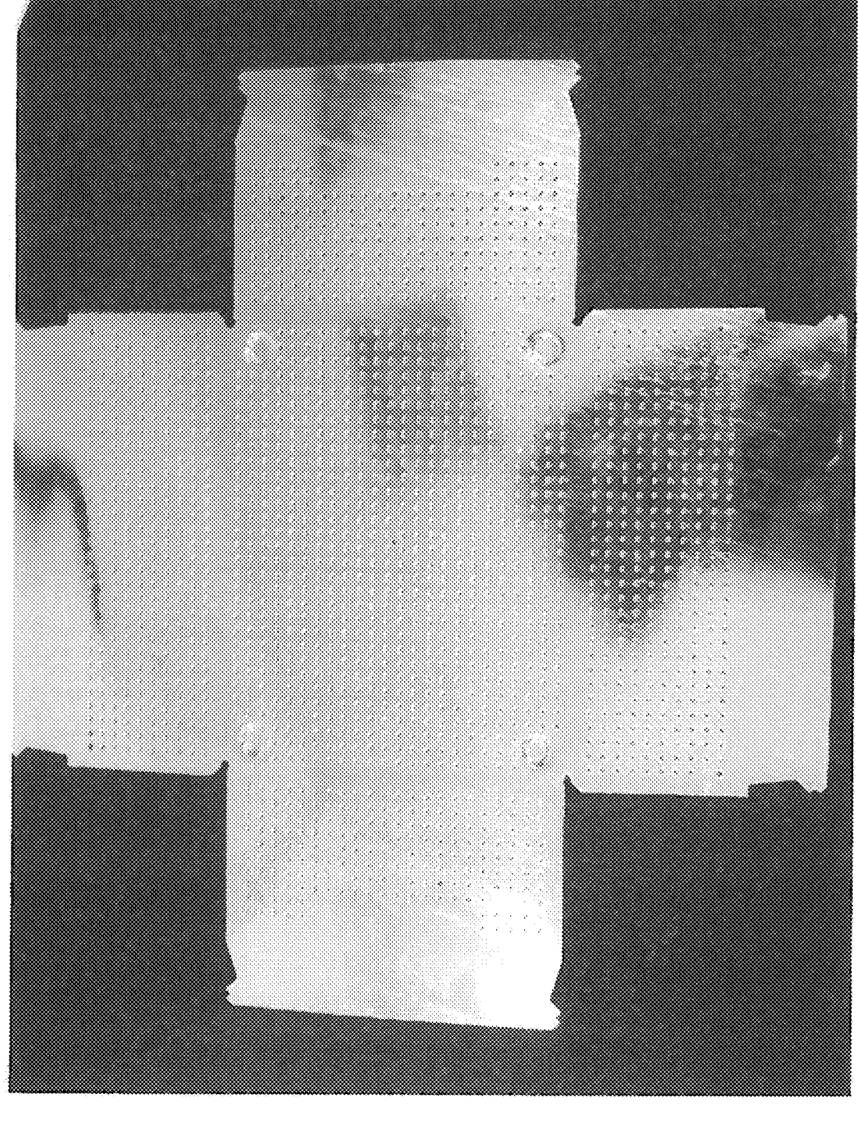
FIG. 1 shows a punched sheet matrix with multiple edges and with a geometric shape that, upon folding in both the horizontal and transversal directions, is suitable for producing a parallelepipedic box or container for transporting goods.

A parallelepidic box with dimensions 40 cm×30 cm has been produced from the pre-cut steel sheet matrix with multiple free edges and with punched holes shown in FIG. 1, the said sheet matrix having a thickness of 1 mm and being coated with a 10 μm thick zinc alloy layer obtained by hot dipping into a molten bath of a zinc alloy comprising 5% by weight aluminum, followed by bending the wall portions at perpendicular angle with respect to the central portion to form the desired parallelepidic shape, and finally forming a series of clinching pints for fastening the multiple adjacent edges. The resulting box is highly corrosion resistant and may be useful, inter alia, for transporting goods.

The invention claimed is:
1. A process for manufacturing a galvanized steel three-dimensional object with a shape including multiple edges, said process comprising, in the following order, the steps of:
(A) providing and cutting a steel sheet matrix with a thickness within a range from 0.8 mm to 6 mm, the shape of said steel sheet matrix including multiple free edges, wherein a portion of the steel sheet matrix provided in step (A) is optionally punched with a series of holes,
(B) batch-wise hot dipping said steel sheet matrix into a molten zinc alloy galvanizing bath, wherein the molten zinc alloy galvanizing bath comprises
  (a) from 2 to 25 weight % aluminum,
  (b) from 0 to 4% magnesium,
  (c) up to 0.1% other metals or silicium, and
  (d) the rest being zinc,
wherein the batch-wise hot dipping step is performed until a zinc-based coating having a thickness within a range from 5 to 20 μm is formed at the surface of the steel sheet matrix,
(C) cold-forming the galvanized steel sheet matrix into a desired three-dimensional shape including multiple adjacent steel edges,
wherein the cold-forming step (C) includes bending or folding the galvanized steel sheet matrix or parts thereof,
wherein the galvanized steel three-dimensional object with a shape including multiple edges is a box or container; and
(D) cold-forming a series of j oining points for fastening together said multiple adjacent steel edges, to form said galvanized steel three-dimensional object,
wherein step (D) consists of cold-forming a series a clinching points for fastening together said multiple adjacent steel edges, and
wherein between the steps (A) and (B) the process involves an intermediate fluxing step consisting of batchwise immersing said steel metal matrix resulting from step (A) into an aqueous fluxing bath based on an aqueous flux composition,
wherein the aqueous fluxing bath used for the intermediate fluxing step comprises
  (a) more than 40 and less than 70 weight % zinc chloride,
  (b) 10 to 30 weight % ammonium chloride,
  (c) more than 6 and less than 30 weight % of a set of at least two alkali metal chlorides including sodium chloride and potassium chloride,
  (d) from 0.1 to 2 weight % lead chloride, and
  (e) from 2 to 15 weight % tin chloride,
  provided that the KCl/NaCl weight ratio of said set of at least two alkali metal chlorides ranges from 2.0 to 8.0; and
  provided that the combined amounts of lead chloride and tin chloride represent at least 2.5 wt. % of said aqueous fluxing bath, and the method further comprises drying the resulting fluxed steel sheet matrix at a temperature from 170° C. to 250° C. prior to step (B).

2. The manufacturing process according to claim 1, wherein the batchwise hot dipping step (B) is performed at a temperature ranging from 380° C. to 550° C.

3. The manufacturing process according to claim 1, wherein fluxing step is performed at a temperature from 50° C. to 90° C.

4. The manufacturing process according to claim 1, wherein the flux composition comprises 3.5 to 15 wt % tin chloride.

5. The manufacturing process according to claim 1, wherein a portion of the steel sheet matrix provided in step (A) is punched with a series of holes.

6. The manufacturing process according to claim 1, wherein the box or container includes one or more punched holes.

7. A process for manufacturing a galvanized steel three-dimensional object with a shape including multiple edges, said process comprising, in the following order, the steps of:
(A) providing and cutting a steel sheet matrix with a thickness within a range from 0.8 mm to 6 mm, the shape of said steel sheet matrix including multiple free edges, wherein a portion of the steel sheet matrix provided in step (A) is optionally punched with a series of holes,
(B) batch-wise hot dipping said steel sheet matrix into a molten zinc alloy galvanizing bath, wherein the molten zinc alloy galvanizing bath comprises
(a) from 2 to 25 weight % aluminum,
(b) from 0 to 4% magnesium,
(c) up to 0.1% other metals or silicon, and
(d) the rest being zinc,
wherein the batch-wise hot dipping step is performed until a zinc-based coating having a thickness within a range from 5 to 20 μm is formed at the surface of the steel sheet matrix,
(C) cold-forming the galvanized steel sheet matrix into a desired three-dimensional shape including multiple adjacent steel edges,
wherein the cold-forming step (C) includes bending or folding the galvanized steel sheet matrix or parts thereof, and
(D) cold-forming a series of joining points for fastening together said multiple adjacent steel edges, to form said galvanized steel three-dimensional object,
wherein step (D) consists of cold-forming a series a clinching points for fastening together said multiple adjacent steel edges,
wherein the galvanized steel three-dimensional object with a shape including multiple edges is a box or container; and
wherein between the steps (A) and (B) the process involves an intermediate fluxing step consisting of batchwise immersing said steel metal matrix resulting from step (A) into an aqueous fluxing bath based on an aqueous flux composition,
wherein the aqueous fluxing bath used for the intermediate fluxing step comprises
(a) more than 40 and less than 70 weight % zinc chloride,
(b) 10 to 30 weight % ammonium chloride,
(c) more than 6 and less than 30 weight % of a set of at least two alkali metal chlorides including sodium chloride and potassium chloride,
(d) from 0.1 to 2 weight % lead chloride, and
(e) from 3.5 to 15 weight % tin chloride,
provided that the KCl/NaCl weight ratio of said set of at least two alkali metal chlorides ranges from 2.0 to 8.0; and
provided that the combined amounts of lead chloride and tin chloride represent at least 2.5 wt. % of said aqueous fluxing bath,
and the method further comprises drying the resulting fluxed steel sheet matrix at a temperature from 170° C. to 250° C. prior to step (B).

8. The manufacturing process according to claim 7, wherein a portion of the steel sheet matrix provided in step (A) is punched with a series of holes.

9. A process for manufacturing a galvanized steel three-dimensional object with a shape including multiple edges, said process comprising, in the following order, the steps of:
(A) providing and cutting a steel sheet matrix with a thickness within a range from 0.8 mm to 6 mm, the shape of said steel sheet matrix including multiple free edges, wherein a portion of the steel sheet matrix provided in step (A) is punched with a series of holes,
(B) batch-wise hot dipping said steel sheet matrix into a molten zinc alloy galvanizing bath, wherein the molten zinc alloy galvanizing bath comprises
(a) from 2 to 25 weight % aluminum,
(b) from 0 to 4% magnesium,
(c) up to 0.1% other metals or silicon, and
(d) the rest being zinc,
wherein the batch-wise hot dipping step is performed until a zinc-based coating having a thickness within a range from 5 to 20 μm is formed at the surface of the steel sheet matrix,
(C) cold-forming the galvanized steel sheet matrix into a desired three-dimensional shape including multiple adjacent steel edges,
wherein the cold-forming step (C) includes bending or folding the galvanized steel sheet matrix or parts thereof,
wherein the galvanized steel three-dimensional object with a shape including multiple edges is a box or container; and
(D) cold-forming a series of joining points for fastening together said multiple adjacent steel edges, to form said galvanized steel three-dimensional object,
wherein step (D) consists of cold-forming a series a clinching points for fastening together said multiple adjacent steel edges, and
wherein between the steps (A) and (B) the process involves an intermediate fluxing step consisting of batchwise immersing said steel metal matrix resulting from step (A) into an aqueous fluxing bath based on an aqueous flux composition,
wherein the aqueous fluxing bath used for the intermediate fluxing step comprises
(a) more than 40 and less than 70 weight % zinc chloride,
(b) 10 to 30 weight % ammonium chloride,
(c) more than 6 and less than 30 weight % of a set of at least two alkali metal chlorides including sodium chloride and potassium chloride,
(d) from 0.1 to 2 weight % lead chloride, and
(e) from 3.5 to 15 weight % tin chloride,
provided that the KCl/NaCl weight ratio of said set of at least two alkali metal chlorides ranges from 2.0 to 8.0; and provided that the combined amounts of lead chloride and tin chloride represent at least 2.5 wt. % of said aqueous fluxing bath,
and the method further comprises drying the resulting fluxed steel sheet matrix at a temperature from 170° C. to 250° C. prior to step (B).

* * * * *